US005568476A

United States Patent [19]
Sherer et al.

[11] Patent Number: 5,568,476
[45] Date of Patent: Oct. 22, 1996

[54] METHOD AND APPARATUS FOR AVOIDING PACKET LOSS ON A CSMA/CD-TYPE LOCAL AREA NETWORK USING RECEIVE-SENSE-BASED JAM SIGNAL

[75] Inventors: William P. Sherer, Sunnyvale, Calif.; Richard A. Gahan, Wexford; John F. Hickey, Tipperary, both of Ireland

[73] Assignee: 3Com Corporation, Santa Clara, Calif.

[21] Appl. No.: 329,714

[22] Filed: Oct. 26, 1994

[51] Int. Cl.$^6$ ................................................ H04Q 11/04
[52] U.S. Cl. ......................... 370/60; 370/85.2; 370/85.3; 370/94.1
[58] Field of Search ........................... 370/60, 94.1, 85.2, 370/85.3, 85.6, 85.8, 85.1

[56] References Cited

U.S. PATENT DOCUMENTS

| | | | |
|---|---|---|---|
| 4,723,311 | 2/1988 | Moustakas et al. | 370/85.2 |
| 4,727,537 | 2/1988 | Nichols | 370/85.2 |
| 5,430,762 | 7/1995 | Vijeh et al. | 370/85.3 |
| 5,434,861 | 7/1995 | Pritty et al. | 370/85.8 |
| 5,446,726 | 8/1995 | Rostoker et al. | 370/60 |

*Primary Examiner*—Douglas W. Olms
*Assistant Examiner*—Shick Hom
*Attorney, Agent, or Firm*—Townsend and Townsend and Crew, LLP

[57] ABSTRACT

An Ethernet network or other CSMA/CD network includes a hub that is modified to generate a jamming signal on a communication line when a packet received over that line is directed to an unavailable destination. The destination may be unavailable due to full transmit buffers, full receive buffers, or congestion in other parts of the hub architecture. Jamming is detected by the source node as a collision and causes retransmission of the packet from the source node. The decision to jam may include a determination of the packet's priority which may be determined based on the packet's destination or source address.

20 Claims, 3 Drawing Sheets

METHOD AND APPARATUS FOR AVOIDING PACKET LOSS ON A CSMA/CD-TYPE LOCAL AREA NETWORK USING RECEIVE-SENSE-BASED JAM SIGNAL

BACKGROUND OF THE INVENTION

This invention relates to transmission of information between two or more digital devices. More particularly, this invention relates to a method and apparatus for avoiding packet loss in a CSMA/CD (Carrier Sense Multiple Access with Collision Detection) network.

Local area networks (LANs) are arrangements of various hardware and software elements that operate together to allow a number of digital devices to exchange data. In the context of network communication, devices on a network are variously referred to as "stations," "nodes," "end systems" (ES), or "data terminal equipment" (DTE). LANs typically are optimized for use in a limited geographic region such as a single office building or a campus.

LANs may vary in the topology of the interconnections among devices. In the context of a communication network, the term "topology" refers to the way in which the stations attached to the network are interconnected. The common topologies for LANs are bus, tree, ring, and star. LANs may also have a hybrid topology made up of a mixture of these.

A number of standards have been adopted in the communication industry for various types of LANs. These standards specify and standardized aspects of the physical (hardware) configuration of network equipment as well as the algorithms (software) used to control network data exchange. Much of the work on the development of LAN standards has been done through the IEEE by a committee known as IEEE 802. The committee has issued a set of four LAN standards: a CSMA/CD standard (IEEE 802.3), a token bus standard (IEEE 802.4), a token ring standard (IEEE 802.5), and an FDDI (Fiber-Distributed Data Interface) standard (IEEE FDDI). These standards subsequently have been revised and reissued by the ISO (International Organization For Standardization) with the designation ISO 8802.

In developing the 802 standards, the IEEE came to the conclusion that the task of communication across the LAN was sufficiently complex that it needs to be broken up into more manageable subtasks. As a result, the 802 standards have organized the tasks of network communication into "layers." The IEEE 802 committee specified three layers for each of the 802 standards, the Physical Layer, Media-access control layer, and Logical Link Control (LLC) layer. These layers are a subset of the well-known Open Systems Interconnection (OSI) layered communication architecture. The OSI layered architecture defines seven layers: physical, data link, network, transport, session, presentation and application.

The 802 Physical Layer handles the encoding/decoding of physical transmission signals, the generation/removal of preambles for transmitted data used for synchronization, and the bit transmission/reception protocol. At the Physical Layer, data is treated as an unformatted bit stream transmitted from one transmitter to one or more receivers over a single link. The 802 Physical Layer specification includes specification of the transmission medium.

The 802 Media-access Control Layer handles data as a series of independent packets, each packet containing its own destination address and fields specifying packet length, priority, and codes for error checking.

The 802 Logical-Link Control (LLC) Layer handles higher-level functions of data exchange between two stations on a network. The LLC specifies three forms of service to LLC users: an unacknowledged connectionless service, a connection-mode service, and an acknowledged connectionless service. In the unacknowledged connectionless service mode a user will make a request at the LLC layer to send a unit of data to a receiver and the LLC will handle transmission by interfacing with the lower layers, but the user will never receive an acknowledgement back from the receiver. In the connection-mode service, the LLC layer or a transmitter will make a semi-permanent connection with the LLC layer of a receiver to facilitate the sending of a stream of packets.

Each of the 802 standards includes specifications at each of the three layers. However, the standards do not necessarily specify the LAN topology, and the same protocol may operate on different network topologies. The 802.3 standard, for example, may operate on a bus, star or hybrid topology.

IEEE Standard 802.3 defines a LAN that uses at its Media-access Control layer a CSMA/CD protocol. This standard was based on the older Ethernet network protocol and 802.3 networks are often referred to as Ethernet networks. As originally conceived and implemented, an Ethernet network allowed a number of stations to each be directly connected to a single communication medium in a bus topology. As an example of the original Ethernet configuration, FIG. 1 depicts a LAN 10 having four stations 12 connected to a physical communication channel 14 in a bus topology. Although the depicted stations 12 are shown as personal computer workstations, a station typically may be any digital device such as a computer device, a peripheral device, or a digital telephone. The workstations 12 are connected to the communication channel 14 through adapters 13. The adapters 13 are specialized circuits that handle transmissions on the network. The communication channel 14 may be an unshielded twisted pair wire (UTP), a shielded twisted pair wire, a coaxial cable or another medium capable of carrying a digital signal. Unshielded twisted pair wire is the conventional wiring in buildings for telephone systems, and thus, is a convenient communication channel.

In a CSMA/CD LAN, peer-to-peer communications among stations are supported without the intervention of a central controller for the network. At the Media-access Control layer, in order to access the network under the CSMA/CD standard, an adaptor 13 connected to a station 12 first listens to the communication channel to determine whether or not another station is transmitting (the carrier sense). If no carrier is sensed, then the adaptor 13 transmits a packet of data on the communication channel 14.

Occasionally, two or more station adapters will listen to the channel at or near the same time, will not sense a carrier, and then will transmit at the same time, resulting in a garbled transmission referred to as a "collision." A receiving station adaptor ignores the garbled transmission, while a transmitting station adaptor must detect the collision and cease transmission once it detects the collision. After a collision, each transmitting adaptor that detected the collision waits a period of time, known as "back-off" time, before attempting to retransmit. The back-off time is measured in a discrete unit defined by a network parameter known as the "slot time." To reduce the chances of a repeated collision, each adaptor generates a random integer which determines the number of slot times that it will wait for back-off. In standard Ethernet, this integer is determined by an algorithm known as "truncated binary exponential backoff." The truncated binary exponential backoff algorithm takes into account the fact that when traffic on the Ethernet channel is heavy, a transmitting station may make a number of unsuccessful attempts to transmit a particular packet. According to the algorithm, the maximum possible backoff is doubled each time an attempt is made to transmit a particular packet. On the first attempt after a collision, the random integer picked by each transmitting station that detected a collision is either 0 or 1, on the second attempt it is between 0 and 3 inclusive, on the third attempt it is between 0 and 7, and so on. Once the backoff time has elapsed, a transmitter listens for a carrier and transmits as soon as there is no carrier on the channel.

Standard 802.3 Ethernet adapters are programmed to make a finite number of attempts (referred to as the maximum attempt limit) to transmit a particular packet before discarding that packet and alerting their station that the packet has been discarded. For standard 802.3 Ethernet, the predetermined maximum attempt limit is sixteen.

The preceding described actions of the CSMA/CD protocol are handled by the Media-access Control layer of the protocol. At the Media-access Control layer, the station only knows whether a data packet was transmitted with no collision detected or whether a collision was detected during transmission. At the LLC layer of the protocol, the receiving station checks the received data packet for validity and then, in acknowledged-connectionless mode or in connection-mode, the receiver sends a acknowledgement packet or a retransmit request back to the transmitting station to let the transmitting station know whether the packet was in fact successfully received. If no acknowledgment packet is received back from the receiver at the transmitter, the transmitter eventually will resend the packet after a predetermined interval of time has elapsed. In unacknowledged connection mode, it is up to the application program to determine that it has not received a data packet and to request retransmission of that packet.

While FIG. 1 depicts the original topology for which Ethernet was designed, the Ethernet 802.3 protocol is employed in a variety of network topologies. FIG. 2 shows a well known modification to the bus topology, which is use of a bridge 36 to link one bus to a second bus. In a bridged system the separate buses are referred to as "segments." A bridge is a computer having a processor, a memory for storing network information, connections to two or more separate communication channel segments such as 32 and 34, a separate bridge adaptor for handling transmissions on each segment, and a buffer memory for storing packets received from one channel for transmission on another channel. Bridge 36 receives packets from a source segment such as channel 32, stores the packets, and then transmits the packets on another segment such as 34, when the bridge detects that the other channel is silent.

In a bridged 802.3 network, stations transmitting packets transmit as though all the stations were on the same bus segment. In other words, at the Media-access Control level, the stations transmit a packet with a destination address with no knowledge whether the packet's destination can receive the packet directly or whether the packet will be bridged. A typical prior-art bridge, therefore, must examine every packet on every segment to which it is connected to determine whether that packet must be bridged to a different segment. Prior art bridges typically will temporally store every packet transmitted on each segment in a receive buffer and then examine the destination address of the buffered packet. If the destination address is for a station on the same segment as the originating station, then the packet has presumable already been received by the destination station and the bridge discards or "filters" the buffered packet. If the destination address is for a station on a different segment from the originating station, the bridge "bridges" the packet by transmitting it on the destination station's bus.

FIG. 3 shows another network topology well known in the art and that may be employed in an 802.3 Ethernet, a star topology. As shown in FIG. 3, a star topology is characterized by a hub 42. A hub provides functions similar to a bridge, but with connections to more than two separate communication channels. In a hub, these connections are sometimes referred to as "ports." Each connection is controlled by a separate hub adaptor. The hub may include a number of point-to-point CSMA/CD connections where just one station is connected to a communications channel, such as 12a', 12b', and 12c', and may also include one or more connections to a segment 14 containing multiple stations, such as 12a–d. On the point-to-point connections, all packet traffic to and from stations 12a'–c' is routed through hub 42. Hub 42 receives and buffers packets from the stations, examines the packets to determine the destination address of those packets, looks up the packet addresses in a link-table that contains routing information for each destination address (typically this routing information specifies which hub port the packet should be transmitted out on), and then transmits the packets out over the appropriate port for that destination.

In a multi-port hub, packets may be coming in at a number of ports, all destined for just one out-going port. Hubs typically include some type of packet storage memory so that incoming packets may be temporarily stored while waiting for an outgoing port to become available. However, typical prior art hubs have no means of flow control so once the incoming receive data storage for a port has been filled up, any new packets received at that port are simply dropped or discarded by the hub. These prior art hubs rely on this dropped packet being detected in either the source or destination station by upper layer software protocols. These software protocols expect to see an explicit/implicit acknowledge for every packet from the destination. (Protocols that have burst modes allow one acknowledge packet to implicitly confirm that a group of packets have successfully been received.) The source node has a timer that it uses to wait for an acknowledge pack from the destination. If this timer expires the source re-transmits the packet. This timer is generally in the order of seconds. Therefore, in prior art hubs, a dropped packet will take several seconds to be detected and retransmitted. Dropped packets are also expensive in terms of consuming network resources because both the transmitting station and the hub must perform all the operations necessary to transfer a full packet before the decision is made to discard the packet.

One prior art system partially recognized this problem in regards to a standard bridge as shown in FIG. 2. Published Japanese Patent Application 1-222373 to Sakamoto, describes having a bridge adaptor jam packets when its receive buffers are full in order to avoid discarding the packets in the bridge after reception. However, the jamming method discussed cannot detect when a destination port is busy or occupied and therefore does not prevent many dropped packets. The method discussed provides inferior performance because it only starts jamming when the receive buffer is completely full. Thus, the method tries to act as an on/off switch. However, this presents a problem when combined with the 802.3 CSMA/CD standard because once a source node has tried to transmit a packet 16 time and has experienced a collision or jam each time, the source adaptor simply discards the packet. When these packets are dropped due to excessive collisions, the source node logs this error on the source node even though the source node was not the cause of the packet being rejected. Existing network management packages therefore may have problems isolating the cause of the problem and so the method is not transparent to the network.

What is needed is a CSMA/CD networking system that can handle the problem of some packet destinations not being always available to receive packets without incurring the network overhead costs associated with dropping a packet at the hub.

SUMMARY OF THE INVENTION

The invention is an improved method and apparatus for transmitting data using a CSMA/CD communication channel. According to one embodiment of the invention, an Ethernet hub is enabled to determine whether the destination path for a packet is available as soon as that packet is beginning to be received and then to force a collision (jam) on the transmission line carrying that packet before the packet is fully received at the hub. As a result of this jamming, according to standard Ethernet Media-access Control Layer protocol, the transmitting station will detect a collision on the packet, halt transmission, and attempt to -retransmit the packet after a back-off delay. The method of the invention is not limited to the particular configurations or hardware described herein but may effectively employed between any two devices communicating via a CSMA/CD channel.

According to the invention, when a packet is received at a hub from a CSMA/CD segment, the status of the destination path for the received packet through the receiving hub is checked. If the path status indicates that the path is able to receive a packet, then the packet is received normally. If the path status indicates that the destination path is functional but not able to receive a packet then a collision (jam) is forced on the receiving segment by the hub. If the destination path status is that the path is not functional then no collision is forced and the packet is received by the hub and then dropped.

The destination path through the hub may include such resources as buses, queues, buffers, processing units or other network stations. In particular, the destination path may include a port transmit buffer for buffering packets before they are transmitted by the hub to another segment. The destination path is determined implicitly or explicitly from the received packet. Implicit determination is done based on information known about the packet other than its contents, such as which CSMA/CD port received the packet. Explicit determination is performed based on information contained within the packet, generally in the packet header, such as the packet's ultimate destination address and its priority.

The invention provides a real-time response to the source station (from here on also referred to as the source node) that the bridge port is "congested" and cannot take the packet at this time. The source node re-schedules the transmission based on the 802.3 truncated binary exponential backoff algorithm. The delay before retransmission is statistically proportional to the number of attempts previously made to transmit the packet. The term "statistical" is used to highlight the random nature of the 802.3 backoff algorithm.

Some of the features of a hub built according to a specific embodiment of the invention are:

1. It throttles back incoming traffic when congestion is detected internally in the hub. This congestion can be detected either at the source port or the destination port.
2. It throttles back incoming traffic selectively to allow only throttling back of packets that can increase the congestion because those packets are destined for unavailable ports.
3. It supports both single station segments (also referred to as point-to-point or Bridge-per-port Ethernet) and bridged segments which have multiple stations being attached to a port on the hub.
4. It provides maximum collision thresholds to disable continuous "jamming" on a port when overload situations occur. This prevents ports attached to repeaters having their transmit packets dropped due to auto-partitioning.
5. It is transparent to and compatible with current CSMA/CD LANs and network management systems as the thresholds to disable continuous "jamming" ensure management statistics are not corrupted.
6. It can prioritize ports or packets to be throttled to guarantee specific ports or packets minimum access latency. This is important in transmitting multi-media data because video data requires low-latency with low packet loss transmission but audio data can have higher latency and a higher packet loss rate.

DETAILED DESCRIPTION OF PREFERRED EMBODIMENTS

Figure 1:
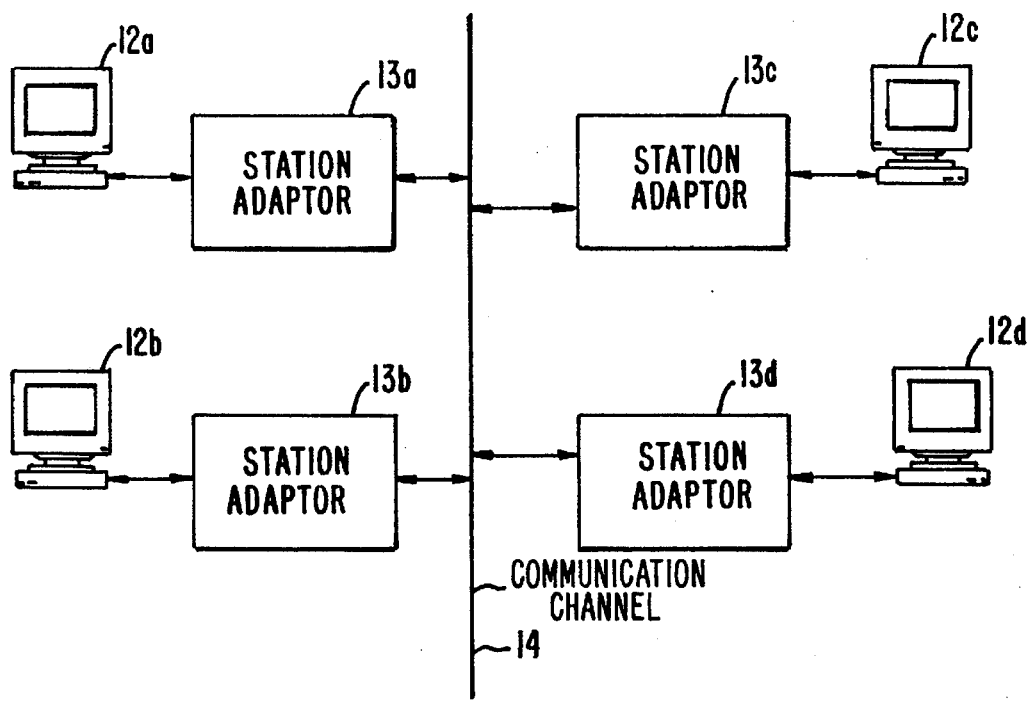
FIG. 1 is a diagram of a conventional (prior art) Ethernet network having a bus topology.
Figure 2:
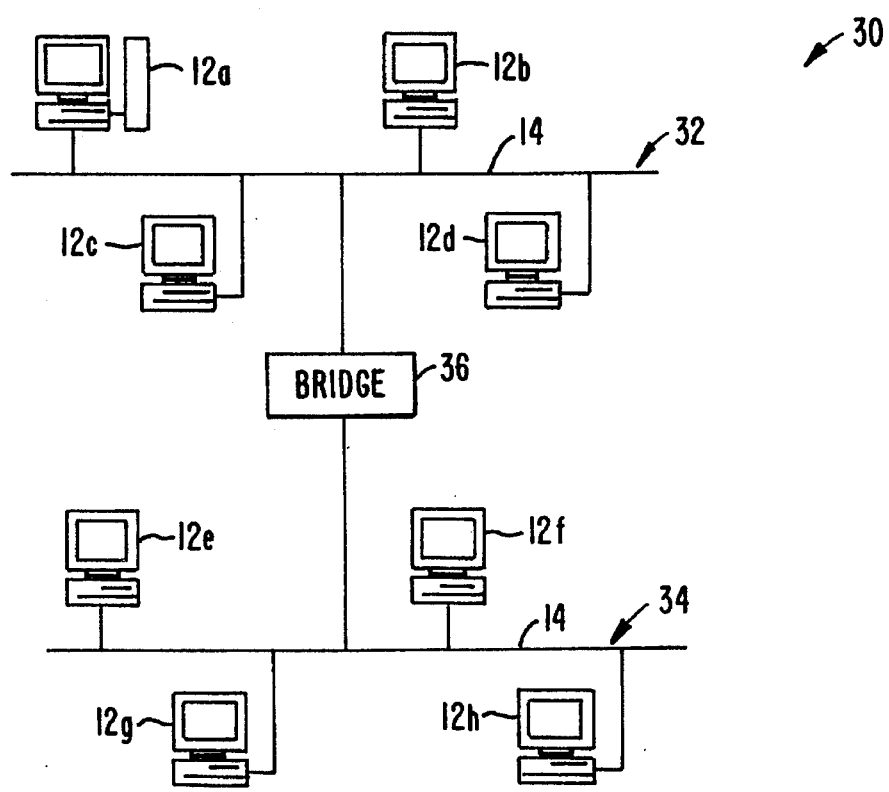
FIG. 2 is a diagram of a conventional (prior art) Ethernet network with two segments connected by a bridge.
Figure 3:
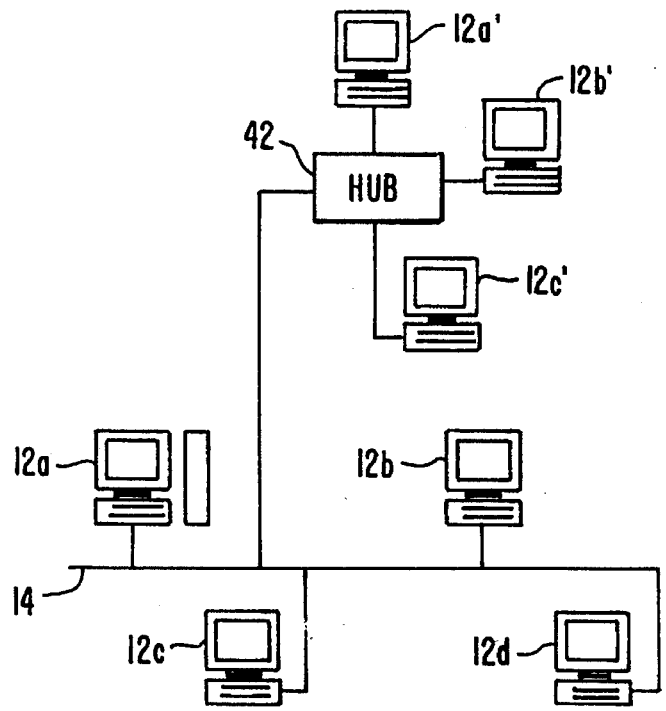
FIG. 3 is a diagram of a conventional (prior art) star Ethernet network.
Figure 4:
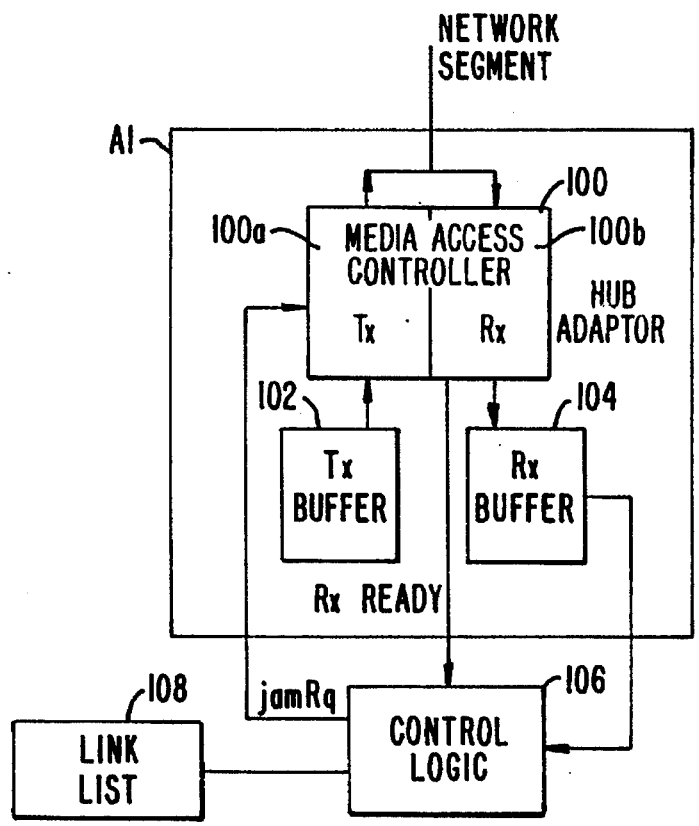
FIG. 4 is a block diagram of an network adaptor circuit built according to the invention.

FIG. 4 is a simplified block diagram of an adaptor circuit for one port of a hub adaptor, such as hub adaptor A1, in which the invention could be employed. The circuit contains a Medium Access Controller (MAC) 100, with a transmit block 100a and a receive block 100b, a receiver buffer 102, a transmitter buffer 104, control logic 106, and a link-list memory 108. Receiver buffer 102 and transmitter buffer 104 may be connected to a data bus (not shown) for transferring data between adapters. The transfer of data between receiver buffer 102 and transmitter buffer 104 is managed by control logic 106. Control logic 106 also monitors the status of buffers 102 and 104 by keeping track of the amount of free space in each. Control logic 106 may be implemented as a separate individual logic block for each port, or may control the transmit and receive functions of a number of ports in a multi-port hub.

Once a port detects that it is receiving a packet from the network, the Control Logic 106 is notified by the signal rxReady. Control logic 106 then reads the packet destination address and uses the packet destination address to look up the destination port for the packet in link-list memory 108. The destination address is found in the first six bytes of the incoming data packet. This look-up can use any of the usual methods known in the art such as a content addressable memory (CAM) look-up or a search through a table. Once the destination port for the packet has been found, Control Logic 106 determines what action to take at the receive port. If the destination port is the same as the source port, then both nodes are on the same segment and no action need be taken at the hub with the packet; therefore the hub simply discards the packet from its receive buffer.

If, however, the destination port is not the same as the source port, Control Logic 106 must determine whether or not to jam the incoming packet. The incoming packet can be jammed if either the destination port's transmit buffer or the source port's receive buffer is critical. Herein, "critical" means that the amount of unused buffer space is below a predetermined watermark defined for each buffer by the user or the system based on desired network performance. When the free buffer space is below the watermark, then that port is termed to be congested.

According to one embodiment of the invention, the transmit buffer watermark for a port may be defined to be disabled so that the user can allow even full transmit buffers not to cause jamming if there is any space in the receive buffer.

According to another embodiment of the invention, control logic 106 is enabled to maintain a per-port collision count and will not cause jamming if the collision count is about to exceed the maximum number of allowed collisions on the port. The collision count corresponds to the number of collisions or jams that the receiving port has experienced since the last successful receipt of a packet. The number of collisions and jams are added together for this count because to the source station transmitting on the segment, they are effectively the same thing. According to the invention, a station simply sees a collision each time the hub causes a jam on the port to which the station is connected. The reason for not continuously jamming is to avoid the station dropping packets in accordance with the 802.3 protocol when the maximum attempt limit for a packet is reached.

According to a further embodiment of the invention, control logic 106 may allow a user to set the collision limit to correspond to the average latency desired on a particular port. For the 802.3 backoff algorithm a maximum attempt of 12 gives an average latency of 105 ms and a maximum latency of 210 ms. A maximum attempt of 13 gives an average latency of 210 ms and a maximum latency of 420 ms. According to the invention, the desired latency may be set on a per-port, a per-destination-address, or a per-source-address basis.

Once Control Logic 106 determines that the incoming packet should be jammed it asserts the jamRq signal to MAC 100. The transmit side 100a of the MAC transmits a jam signal on its segment once jamRq is asserted, ignoring the 802.3 deference rules, providing that the packet is still being received. If the packet is finished being received when jamRq is asserted, MAC 100 does not send a jam packet. The jam packet will ensure that the source station will detect a collision and will schedule the packet for re-transmission. As described above, in one embodiment MAC 100 increments a collision count every time a jam is transmitted or a normal transmit collision occurs. Once the user programmed limit is reached no more jams will be sent. The collision count by MAC 100 is reset upon the successful receipt of a packet. This detection of receipt can be anything from the detection of carrier sense for an incoming packet to the validation of the receipt of a valid packet.

According to one embodiment of the invention, control logic 106 is enabled to discard or drop packets that are considered lower priority when congestion occurs (i.e., when transmitter buffering fills up) rather than jamming those packets. The decision to discard lower priority packets can be included in the jamming determination made by control logic 106 to allow greater fine tuning of packet latency and is especially desirable in networks that may carry multi-media data packets, including sound and video, which require different latency characteristics. According to another embodiment, the decision to discard lower priority packets could be implemented on a per-destination-address basis (explicit determination) rather than a per-port basis (implicit determination) for greater flexibility and control.

Figure 5:
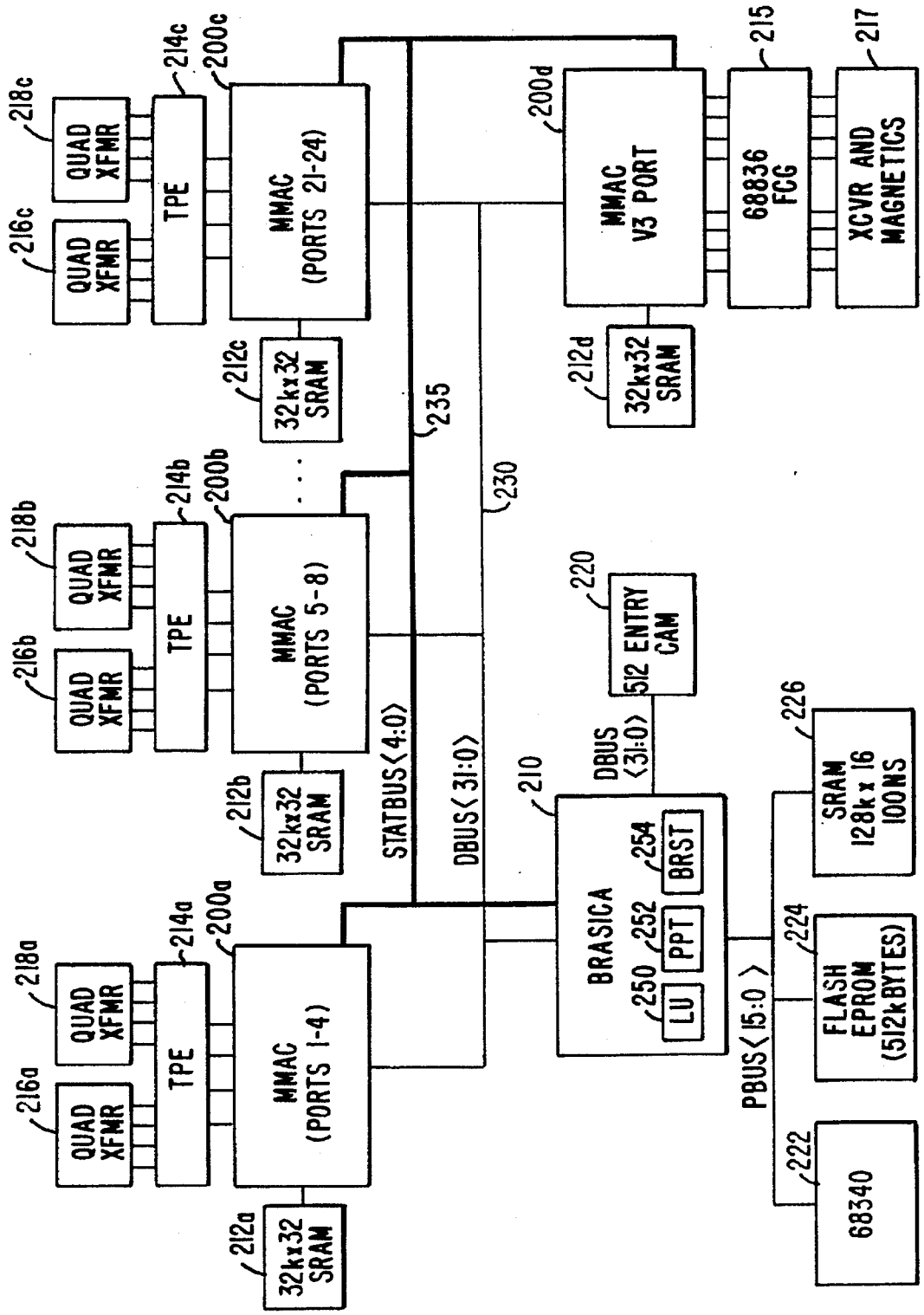
FIG. 5 is a circuit schematic of a particular implementation of a network hub built according to the invention.

FIG. 5 is a detailed circuit schematic of a particular hub configuration built according to the invention. The hub circuitry is comprised of five application specific integrated circuits (ASICs). Four of these ASICs are Multiple Media Access Controller Chips (MMACs) 200a–d, and one is a Bridge Application Specific Integrated Circuit (BRASICA) 210a. Three of the MMACs 200a–c are controllers for four ports. Associated with each MMAC 200a–c is an SRAM memory 212a–c, a TPE 214a–c, quad transmit transceivers 216a–c and quad receive transceivers 218a–c. MMAC 200d is a high speed MMAC for transmitting and receiving on one highspeed port. Associated with MMAC 200d is SRAM memory 212d, FCG 215, and high speed transceiver 217. Associated with BRASICA 210 is a content addressable memory (CAM) 220, a processor 222, an EPROM memory 224, and a SRAM memory 226. MMACs 200 and BRASICA 210 exchange data over data bus (DBUS) 230, and exchange control signals over STATBUS 235.

The MMAC Chip

MMAC chips 200 implement all the functionality associated with the IEEE 802.3 Media Access Control layer and control the storing of receive/transmit data on a per port basis. MMAC chips 200 may be operated in one of two modes. In a first mode, an MMAC controls four ports operating under standard 10 BaseT Ethernet protocol (referred to as V1 mode and transferring data at 10 Mbps). In a second mode, an MMAC controls just one port operating according to 100 BaseT Ethernet protocol (referred to as V3 mode and transferring data at 100 Mbps). As shown in FIG. 5, MMAC is 200a–c operate in V1 mode and MMAC 200d operates in V3 mode. In V1 mode, the four MMAC ports share access to a common SRAM 212 for packet buffering on receive and transmit. In V3 mode, only one MMAC port can be enabled as all the SRAM 212 space is needed to service just one V3 port.

The packet data is stored in receive and transmit FIFOs for each port (i.e., one receive and one transmit FIFO per port). These FIFOs are implemented using external SRAM 212 shared among the four ports in the MMAC. The SRAM contains four 32 k×8 blocks of memory split 1:1, 2:1 or 1:2 between Rx FIFO and Tx FIFO. In V3 mode, the SRAM will be allocated entirely to one port, thus giving 128 kbytes on Rx and 128 kbytes on Tx for a 1:1 split of memory. The MMAC SRAM interface is designed to allow the use of 64 k×16 and 128 k×8 SRAM if increased data buffering is required.

The BRASICA Chip

BRASICA chip 210 implements all the bridging functions of the hub. BRASICA 210 scans the STATBUS 235 visiting each port in a round-robin manner searching for a signal LURQ. When LURQ is asserted on a port, BRASICA 210 reads the destination address (DA) and source address (SA) across DBUS 230 into internal latches. BRASICA 210 uses the DA and SA to search the current known addresses that are stored in a 512 entry CAM 220. CAM 220 contains all the addresses known for LAN segment ports. If the SA is not found in CAM 220, the processor 222 will be interrupted to "learn" this address into CAM 220. All learning, aging and entry deletion in CAM 220 is performed by processor 222. CAM 220 contains a 48-bit address portion and a 16-bit associated data portion in which the entry age, port ID, etc., are stored.

If the DA and SA are matched in CAM 220, BRASICA 210 writes the destination port number back to the source MMAC port. If the destination is not found the BRASICA will write back the downlink associated with the port being looked-up. Each port will be associated with only one downlink. Every port can be configured as a downlink by the processor if required.

BRASICA 210 includes an interface to the processor 222. This processor interface allows processor 222 to read and write to CAM 220, to the BRASICA registers and to MMAC 200 registers.

BRASICA Link Table

BRASICA 210 uses SRAM 226 to maintain a link table with a table entry for each of the 32 Rx ports in the hub. This is the central control table for the system, indicating who wants to talk to whom (Valid bit), who is currently talking to whom (GO bit), whether a transfer is to be multicast or not, whether ports are enabled, and so on. Other information is stored in the table, such as downlink port number for a particular port. However, workgroup information is not contained in the link table, as this is instead distributed to the MMAC chips, which decide whether or not to accept a packet based on workgroup match.

This table is scanned using the Rx-port number as the address into the table. Each entry in the table contains 6 fields, all but one of the fields being one-bit wide. The bits in the table are defined as follows:

TX-port<4:0>: When the valid bit is set, this 5-bit field indicates that a receive port needs to send a packet to this transmit port. This field is updated by a Look-up (LU) state-machine 250 in BRASICA 210 on setting the Valid bit.

Valid: This bit is set by LU state-machine 250 along with the TX-port value after an address look-up request, that did not indicate a discard. It is cleared by Per-Packet (PPT) machine 252 after the packet transfer.

GO: This bit is set by a PPT machine 252 to indicate to Burst machine 254 that it should service this link as part of its list. It is not examined when the Valid bit is clear.

EOF: This is set by the Burst machine 254 when it detects end of frame on the DBUS. It is cleared by PPT machine 252.

M\CAST: This is updated along with the TX-Port number when the Valid bit is being set. It is used by PPT engine 252 when initiating a multicast packet transfer.

PORT-En: This bit is updated by processor 222. It indicates if a receive port status should be examined by the various state-machines.

BRASICA 210 contains three engines to handle hub bridging functions. The three engines are Look-up engine (LU) 250, Per-packet engine (PPT) 252, and Burst Level engine (BRST) 254. The three main engines in BRASICA all use link-list table 220 to set-up and terminate links between the various receive ports and transmit ports on a packet by packet basis.

LU 250 polls the MAC ports over status bus 235 to determine if any receive ports require an address look-up. If a receive port requires an address look-up, LU 250 performs the look-up in CAM 220 and sets the Valid bit and the transmit port number in the table for that receive port to indicate that a packet needs to be transferred to the transmit port. It also informs the MMAC receive port to which port the packet is destined. If the receive port is to discard the packet then LU 250 indicates this to the MMAC port by setting a discard bit. In the discard case, no entry is made in the link-table. All port look-up requests are serviced by LU 250 in a round-robin fashion. The Port-enable (Port-en) bit will be set by CPU 222 to indicate if the receive port is enabled or not. If disabled then LU machine 250 ignores that channel.

PPT 252 decides in a fair manner which receive port transfers a packet to a particular free transmit port, based on the VALID bits set in Link-table 220 for that receive port. After the PPT state machine has made a decision to start the packet transfer, it sets the GO bit in the table for the receive port from which the packet is coming.

BRST 254 scans the table for valid entries that have the GO bit set. It then initiates a four longword burst transfer over DBUS 230 from the MMAC receive port to the destination port. After the completion of this burst, it moves on to the next port requiring service. The high speed ports are examined much more frequently. BRST machine 254 also examines the End-of-Frame (EOF) indicator on the DBUS (transmitted during the last burst of the packet). On observing the EOF bit for a packet, BRST 254 sets the EOF bit in link-list 220 and PPT 252 clears the Valid bit in the link-list entry for that port to tear down that link. At the same time, PPT 252 decides which receive port can transfer a packet to that transmit port next, in a fair manner.

Data Bus (DBUS)

DBUS 230 is a 32 bit bus along which the data packets are transferred. BRASICA 210 controls the access to the DBUS by driving out different addresses. The addresses are divided into three types: reads and writes of individual port registers to configure or check status of a port; reads of 12 bytes of Rx data from a port as part of the Look-up process (Reading these 12 bytes during look-up will not cause the Rx FIFO to pop these bytes); and a data transfer cycle from Rx port to Tx port. Data transfer cycles are different from the other addressed cycles in that they can vary from 1 to 5 cycles. The first longword in data transfer cycles is an address phase. The bits in this address phase are defined as follows:

EOF: End of Frame bit. When asserted indicates this is the last transfer for the current packet.

ABRT: Abort bit. This is asserted with EOF to indicate this packet should be aborted by the Tx port and is the last transfer for this packet.

SIZ<1:0>: These two bits indicate the number of bytes in the last longword in the data cycle. 00 indicates all four bytes are valid.

MNGT: Management bit. When asserted this indicates that the management port should take this packet as well as the DSTPORT. This allows a packet to be copied to management as well as a DSTPORT.

M/cast: Multicast bit. Indicates that this data transfer is part of a multicast packet. All ports with the same WG number should take this packet and transmit it.

WG<7:0>: Workgroup number. This defines the workgroup that the port that receives the packet belongs to. This is used by all the Tx Ports if workgroups are enable to determine if the source port is in the same workgroup as they are. If not (and workgroups is enabled), they will not forward the packet even if the DSTPORT indicates the packet is for them.

DSTPORT<7:0>: Destination port number. Defines the port that needs to write this data transfer into its Tx FIFO.

The destination port's address and source port's workgroup number are driven out on the first longword followed by up to four longwords of data. If the Rx Port is not ready with data (due to internal contention for the common SRAM), it will de-assert a DBUS control signal called RXVALID during the Destination Address phase of the data transfer cycle. This will indicate to all the Tx ports in the MMAC and to BRASICA that this cycle should be aborted. Only the port that matches DSTPORT (and WG if workgroups is enabled) will accept the data from the bus. If the Tx Port is not able to accept data from a Rx port (due to internal contention for the shared SRAM), it will assert DBUS control signal called TXBUSY in the cycle after the address. Assertion of TXBUSY will inform BRASICA to abort the cycle and for the Rx port not to pop the data. When the M/cast bit is asserted during a transfer, all ports (or all ports that match WG if workgroups is enabled) accept the packet from the bus.

Operation of MMAC and BRASICA

A packet received at a port from a network segment is stored in that port's MMAC Rx FIFO until the BRASICA chip has looked up the DA and SA. This is achieved using a five bit Status Bus (SBUS) 235. The Sbus is used to read the current status of the receiver and transmitter on each port. The MMACs are read-only on the Sbus. Each port contains the following Status Bits that can be read on the Sbus by BRASICA:

- LURQ: Look-up request bit that indicates that the port has a new packet at the top of its Rx FIFO. Set when at least twelve bytes are available to be read by BRASICA.
- RXCT: Receiver Cut-Through bit that indicates the current status of the packet at the top of its Rx FIFO. When set indicates the current packet at the top of the Rx FIFO is still being received from the network.
- TXCT: Transmitter Cut-Through bit indicates that the Tx FIFO for the port is nearly empty (less than a set number of bytes) and could cut-through a packet in the near future.
- TXRDY: Transmitter Ready bit indicates that the Tx FIFO has space for at least a maximum sized packet.
- BLURQ: Back Look-up Request bit that indicates that the port has a new packet being received from the wire. This bit is only used when smart jamming is enabled for the port. This is set when at least eight bytes are available to be read by BRASICA.

BRASICA 210 reads the first twelve bytes (or eight bytes in the case of a Back Look-up) across the DBUS from MMAC 200 when it detects the LURQ (BLURQ) bit is set for a port. This read will not remove data from the Rx FIFO in normal mode (also called bridge mode). In another mode, known as router mode, this read will be in sixteen byte blocks and will remove the data from the FIFO.

After BRASICA 210 has completed the look-up, it writes the Destination Port number to the source MMAC across DBUS 230. BRASICA 210 then controls the MMAC's data transfer across DBUS 230 to the destination port on a burst by burst basis until the whole packet has been transferred to the destination port. BRASICA uses link-list 220 to store entries that are set up at the DA/SA look-up stage and torn down at the end of each packet to control data transfer in a fair manner.

MMAC 200 will allow cut-through to be started after a programmable minimum number of bytes have been received based on the value set in the Rx Cut-Through register. This register can be set from twelve bytes (the minimum size before cut-through could start) to End-of-frame detection (i.e., until the whole packet has been received). This will be controlled by not asserting the LURQ flag until the Rx Cut-Through register value has been exceeded.

Similarly the transmitter for each port has a register that can be programmed to the minimum number of bytes that must be in the Tx FIFO before transmission can start. This will allow the start of transmission to be delayed to avoid under-runs in a very congested hub.

BRASICA 210 can command MMACs 200 to discard a packet from their Rx FIFO. This is used to filter received packets when BRASICA determines that the source port and destination port for the packet are the same, in which case the packet has been received at its destination station without any bridging by the hub. The Rx port in the MMAC will pop the packet at the top of its FIFO when given this command. Similarly, when a Rx port in a MMAC detects it has received an incomplete runt packet, it will discard it without asserting LURQ. When the Rx port is working in cut-through mode, it may have already started data transfer to the Tx port before it detects the runt (or any other error in the received packet). In this case the Rx port will indicate to the Tx port to discard the packet as soon as possible by sending an End-of-Frame indicator together with asserting ABRT in the address phase of the data transfer cycle on the DBUS. The Tx port will see this abort message and discard the packet in the Tx FIFO if it has already started transmission. This will guarantee that the stations that receive this packet will detect an error and discard it.

Jamming Operation of MMAC and BRASICA

Jamming in the hub has two modes. The first, known as Rx Jamming (also referred to as dumb jamming or MMAC jamming), allows the receiver to cause a collision to the transmitting device if all receive buffering for that port as used, thus causing the transmitting station to re-try transmission later when the receiver may have freed up some buffer space for a new packet. The backoff time after the collision is much less than the time required for a higher layer protocol to time-out had the packet been dropped. MMAC jamming allows temporary congestion situations in the receive buffers to cause packets to backup at the transmitting stations, thus effectively increasing packet buffer memory.

The second jamming mode for packets going from station to station is called Tx Jamming (also referred to as BRASICA jamming or smart jamming). In this mode, the Receive port posts a look-up as soon as the packet header has been received. Look-up machine 250 finds out which port this packet is destined for and checks the state of its that port's Tx FIFO. If the Tx FIFO is "critical" (i.e., less than the space for a maximum size packet), look-up engine 250 informs the Rx port to jam the incoming packet. The receive packet will be jammed provided this look-up result is returned to the receive port within 40 μs to ensure that the Rx port does not cause a late collision on the channel. If the result is not returned to the Rx port within 40 μs, the packet will not be jammed. The 40 μs time may be exceeded if the Look-up machine 250 is very busy and cannot get around to servicing the Rx port in time. Statistically, this should be a rare event.

Congestion Control

Congestion in the hub due to two Rx ports contending for the same Tx port is controlled by BRASICA 210 ensuring Rx cut-through packets (i.e., packet still being received into the Rx FIFO from the network) are only linked to a Tx port if that port is nearly empty. Only if the Tx port is nearly empty will cut-through to it have any benefit. When cutting through to a Tx port, all other Rx ports that have a packet at the top of their FIFO destined for the same Tx port could be potentially held-up for 1.2 ms (i.e., time for a maximum size packet on a 10 Mbps network). During this time, packets further down the Rx FIFO are held up even if they are destined for a different and available Tx FIFO. Thus, BRASICA 210 does not connect a Tx port with Rx port that is trying to cut-through unless the Tx port is nearly idle (nearly idle being defined by a configuration register in MMAC 200). The status of the Rx port packet and the Tx port are read by BRASICA 210 via the SBUS (RXCT and TXCT bits). "Blocking" of Rx ports due to servicing cut-through packets should be temporary and infrequent condition. As soon as the cut-through packet has been completely transferred, the "blocked" port's packet will be transferred quickly (as it is a fully stored packet) thus filling up the Tx ports buffer. To help "tune" performance, BRASICA 210 will log the contention condition and inform processor 222 of it (either through an interrupt or a polling mechanism). Processor 222 can then decide to turn-off cut-through on the offending ports for a predefined period of time.

Two modes of packet discard due to congestion can be used. The first mode is to discard at the Tx port. In this mode, BRASICA 210 sets up the link without checking the state of the Tx FIFO (TXRDY). The Tx FIFO in this case (when not able to accept a maximum size packet) ignores the data transfer cycles and writes none of this packet into its SRAM 212. The second mode is discard at Rx Port. In this case, BRASICA 210 checks the state of the Tx FIFO before setting up the link. If there is not room for a maximum size packet, BRASICA checks the state of the Tx FIFO before setting up the link. If there is not room for a maximum size packet, BRASICA delays starting the data transfer until the Tx FIFO has space. No other port will be linked to this Tx port until the Rx port has been allowed to transfer a packet to it. This ensures fair access to the Tx port for all Rx ports. Each mode can be selected on a per port basis.

Unicast Packets

Unicast packets received on a port are handled one at a time in the order they are received. The packet is not transferred to its destination port until the look-up has been completed and the receive port has been allocated the destination port via the link table. Once a Rx port has been allocated a Tx port, the packet is transferred directly from the Rx port to the Tx port using data transfer cycles on the DBUS (see DBUS section). Packets build up in the Rx FIFO behind the one at the top of the Rx FIFO. These packets will not be processed until the top packet has been completely transferred or discarded.

Multicast Packets

Multicast packets are packets received at one Rx port but destined for more than one Tx port. Multicast packets cause BRASICA 210 to wait until all Tx ports are free to take a packet. BRASICA 210 will link no other Rx ports to a Tx port until the multi-cast packet has been sent. Once all Tx ports are free for a transfer, the multi-cast packet is sent via DBUS 230 to all Tx ports (who know to pick it up via the multi-cast bit in the address phase of the data transfer cycle). This way multi-cast packets are sent only once across the bus. BRASICA 210 can be set to discount the TXRDY bit in discard at Rx mode for multicast packets. Effectively these packets can be discarded at the Tx port as if in discard at Tx mode. This avoids a multicast packet holding up all ports until a congested port becomes free. Also to avoid possible congestion, multicast packets will never be cut-through by BRASICA 210. An Rx port receiving a multicast packet will only be linked to Tx ports after the packet is fully received and stored in an Rx buffer.

The invention has now been explained with reference to specific embodiments. Other embodiments will be apparent to those of skill in the art. It is therefore not intended that this invention be limited, except as indicated by the appended claims.

What is claimed is:

1. In a carrier-sense/collision-detect network, a method for avoiding packet loss at a receiving node comprising the steps of:

reading a packet header as soon as a packet is beginning to be received at a receive port;

reading a destination address in said packet header;

using said destination address to determine a destination path of said packet;

detecting whether said destination path is available to receive said packet;

if the destination path is available, receiving said packet at said receive port normally; and if the destination path is unavailable, causing a collision at said receive port so that the packet will be retransmitted by a transmitting node.

2. The method according to claim 1 further comprising the steps of:

determining whether a receive buffer associated with said receive port is available to receive said packet; and if said receive buffer is unavailable, causing a collision at said receive port so that the packet will be retransmitted by a transmitting node.

3. The method according to claim 1 further comprising the steps of:

setting a transmit buffer watermark indicating the amount of free space desirable to be left in a transmit buffer; and if said destination path includes a transmit buffer, using said transmit buffer watermark for said transmit buffer in determining if said destination path is available by comparing the free space available in said transmit buffer to said watermark and causing a collision if said watermark indicates not enough free space is available in said transmit buffer.

4. The method according to claim 2 further comprising the steps of:

setting a receive buffer watermark indicating the amount of free space desirable to be left in a receive buffer;

using said receive buffer watermark by comparing the free space available in said receive buffer to said watermark and causing a collision if said watermark indicates not enough free space is available in said receive buffer.

5. The method according to claim 1 or 2 further comprising the steps of:

incrementing a collision detect counter for said receive port each time a collision is detected on said receive port or a collision is caused;

comparing said counter to a maximum collision limit; and if said collision detect counter equals said maximum collision limit, receiving said packet without causing a collision.

6. The method according to claim 5 further comprising the steps of:

determining a maximum latency desired at said receive port; and setting said collision counter to guarantee said maximum latency desired.

7. The method according to claim 1 or 2 further comprising the steps of:

reading from said packet header information indicating a priority for said packet; and disabling jamming at said receive port if said priority information indicates that said packet is a high priority packet.

8. The method according to claim 1 or 2 further comprising the steps of:

reading from said packet header information indicating a priority for said packet; and disabling jamming at said receive port if said priority information indicates that said packet is a low-priority packet.

9. A carrier sense/collision detect hub comprising;

a plurality of ports capable of transmitting and receiving data from remote stations;

a plurality of adaptors, one for each port, for controlling signal and data exchange over said ports;

a plurality of shared buffer memories for buffering data received on said ports or waiting to be transmitted on said ports;

a hub controller;

means in said hub controller for reading the destination address of a data packet received on one of said ports;

look-up means for using said destination address to look up a destination path of said data packet;

means for detecting whether said destination path of said data packet is available; and jamming means for causing a collision at said one of said ports in response to destination path being unavailable.

10. The device according to claim 9 further comprising:

means at each of said ports for detecting whether a receive buffer is available, and;

receive jamming means for causing a collision at said port when said receive buffer is unavailable.

11. The device according to claim 9 further comprising:

means for registering a watermark for a transmit buffer in said destination path;

means for comparing said watermark to the free buffer space available at said transmit buffer; and means for causing a collision at said receiving port if the result of said comparing indicates that said transmit buffer is not available.

12. The device according to claim 11 further comprising:

means for registering a watermark for a receive buffer;

means for comparing said watermark to the free buffer space available at said receive buffer;

means for causing a collision at said receiving port if the result of said comparing indicates that said receive buffer is not available.

13. The device according to claim 9 further comprising:

means for registering a collision detect counter for each of said receive port;

means for incrementing said collision detect counter each time a collision is detected on said receive port or a collision is caused by said hub;

means for comparing said counter to a maximum collision limit;

means for supressing caused collisions at said port if said collision counter equals said maximum collision limit; and means for resetting said collision counter each time a packet is successfully received at said receive port.

14. A hub for use with a plurality of CS/CD stations comprising:

a plurality of multiple media access controllers, MMACs, each MMAC capable of transmitting and receiving data on a plurality of ports;

a plurality of shared buffer memories, one for each MMAC, for buffering data received on said ports or waiting to be transmitted on said ports;

a hub controller;

a look-up memory connected to said hub controller;

a data bus for transmitting data among said MMACs and said hub controller;

a status bus for transmitting control information among said MMACs and said hub controller;

means in said hub controller for reading the destination address of a data packet received on one of said ports;

means for using said destination address to look up in said look-up memory a destination path of said data packet;

means for detecting whether said destination path of said data packet is available;

jamming means for causing a collision at said one of said ports if said destination path is not available.

15. The device according to claim 14 wherein said MMACs may be configured to operate in one of two modes, said two modes comprising:

a first mode wherein said MMAC provides media access control to up to four ports operating at a designated data speed; and a second mode wherein said MMAC may provide media access control to one port operating at a higher designated data speed.

16. A hub controller for use in CSMA/CD network-hub comprising:

a bus interface for communicating control information and data to a plurality of port adaptors over a bus, said port adaptors including a transmit buffer and a receive buffer, including means for receiving a signal indicating a packet is being received at one of said port adaptors and means for communicating a jam request signal to one of said port adaptors;

a destination address look-up memory interface for storing and retrieving a plurality of destination address destination paths in a destination address look-up memory;

a look-up engine means for polling said plurality of port adaptors to determine if any of said port adaptors contains a packet that requires a look-up and then performing a look-up in said look-up memory to determine the destination path through said hub of said packet;

means for determining the status of said destination path;

means for generating a jam request to said receive port if said destination path is not available;

a per-packet engine means for determining in a fair manner which receive port buffer will be connected to said bus;

a burst level engine means for initiating data transfers between a receive port and a transmit port; and a link table memory interface for storing and retrieving link table entries, said link table entries indicating a link between a receive port and a transmit port.

17. The device according to claim 16, wherein said link table comprises a plurality of entries, each entry corresponding to a receive port, for storing information regarding the link from that receive port and wherein said entries comprise:

a valid bit for indicating whether or not a packet is to be discarded;

a go bit for indicating that a link is to be serviced; and a transmit port address.

18. A multiple port controller for use in CSMA/CD network hub comprising:

a plurality of port connectors providing connection to a plurality of ports each capable of connecting with a CSMA/CD channel;

a bus interface for communicating control information and data among a plurality of multiple port controllers and a hub controller over a bus;

a shared buffer memory interface for storing and retrieving packets received on said ports in a shared buffer memory;

means for transmitting a signal via said bus interface indicating a packet is being received at one of said ports;

means for receiving a jam request signal over said bus from said hub controller; and means for generating a jam packet in response to said jam request signal.

19. The device according to claim 18 further comprising:

means for detecting if a receive buffer for a port is unavailable; and means for generating a jam packet in response to said detecting means when a receive buffer for a port is unavailable.

20. The device according to claim 18 or 19 further comprising:

a collision counter for counting a number of collisions or jams on a port;

means for suppressing generation of a jam packet when said collision counter reaches a predetermined value; and means for resetting said collision counter when a packet is successfully received.

* * * * *